United States Patent [19]

Hirashima

[11] 4,222,073
[45] Sep. 9, 1980

[54] MULTIPLEXED INFORMATION SIGNAL RECEIVING SYSTEM

[75] Inventor: Masayoshi Hirashima, Ibaraki, Japan

[73] Assignee: Matsushita Electric Industrial Co., Ltd., Osaka, Japan

[21] Appl. No.: 950,149

[22] Filed: Oct. 10, 1978

[30] Foreign Application Priority Data

Oct. 19, 1977 [JP] Japan .............................. 52-126132
Oct. 19, 1977 [JP] Japan .............................. 52-126133

[51] Int. Cl.² .......................................... H04N 7/04
[52] U.S. Cl. ................................. 358/145; 358/160; 358/176
[58] Field of Search ............... 358/142, 145, 160, 174, 358/176, 12

[56] References Cited
U.S. PATENT DOCUMENTS

| | | | |
|---|---|---|---|
| 3,902,007 | 8/1975 | Justice | 358/145 |
| 4,005,265 | 1/1977 | Verhoeckx et al. | 358/145 |
| 4,074,315 | 2/1978 | Kawamura et al. | 358/142 |

Primary Examiner—Richard Murray
Attorney, Agent, or Firm—Stevens, Davis, Miller & Mosher

[57] ABSTRACT

A system for receiving a bi-level information signal multiplexed with a television signal or the like comprises a receiving circuit for receiving the television signal on which the bi-level information signal such as a still image video signal is superimposed during a vertical retrace period, an upper level detecting circuit for detecting an upper level of a start signal indicative of a reference phase and a reference amplitude inserted at a leading portion of the information signal and a lower level detecting circuit for detecting a lower level of the start signal. In response to output signals from the upper and lower limit detecting circuits, a slicing level of a slice circuit to which the information signal is fed is automatically controlled to a predetermined level so that the waveform is always reshaped at an exact slice level regardless of variations in the transmitted information level in order to assure exact reproduction of the information signal.

10 Claims, 26 Drawing Figures

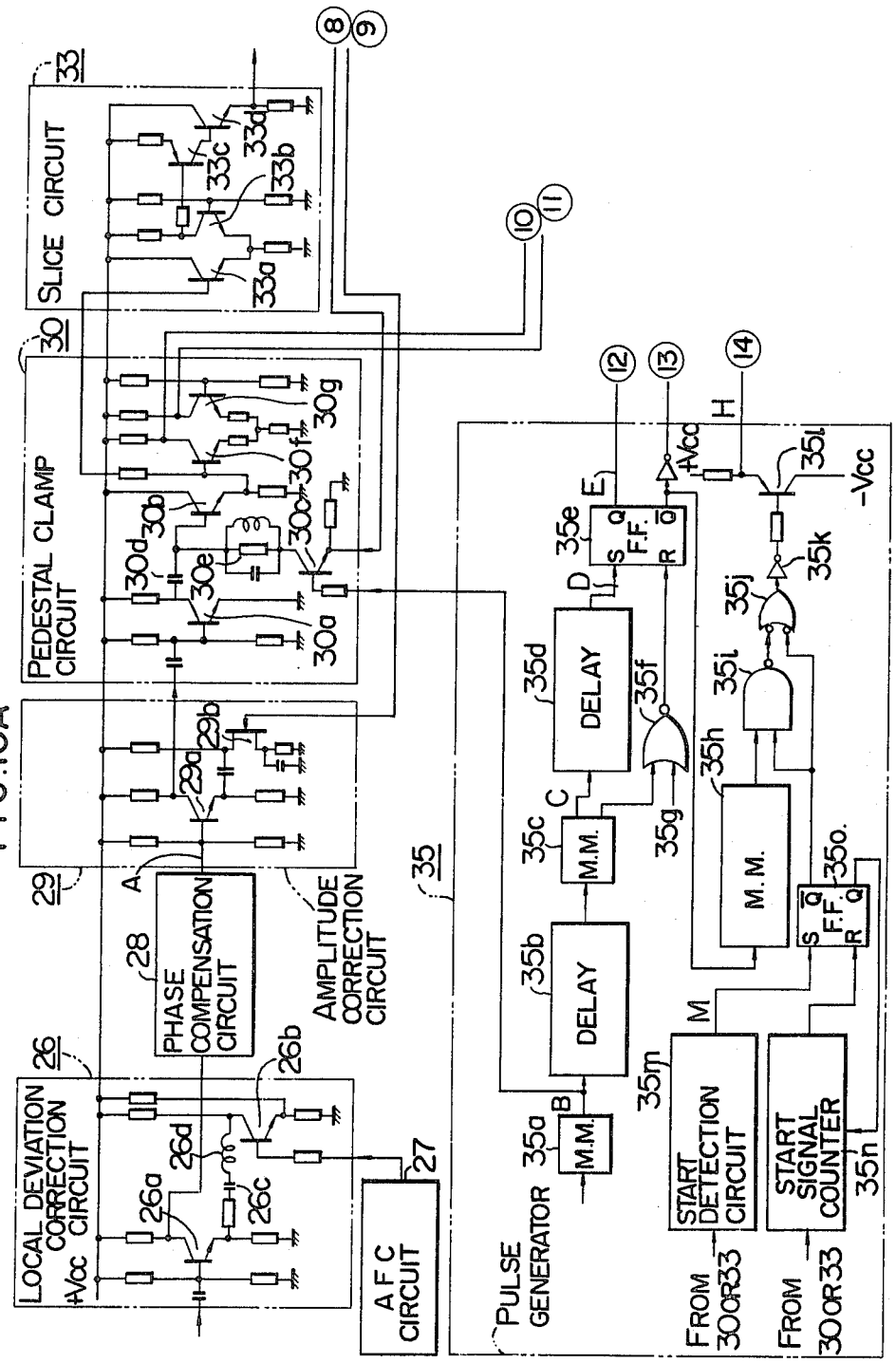

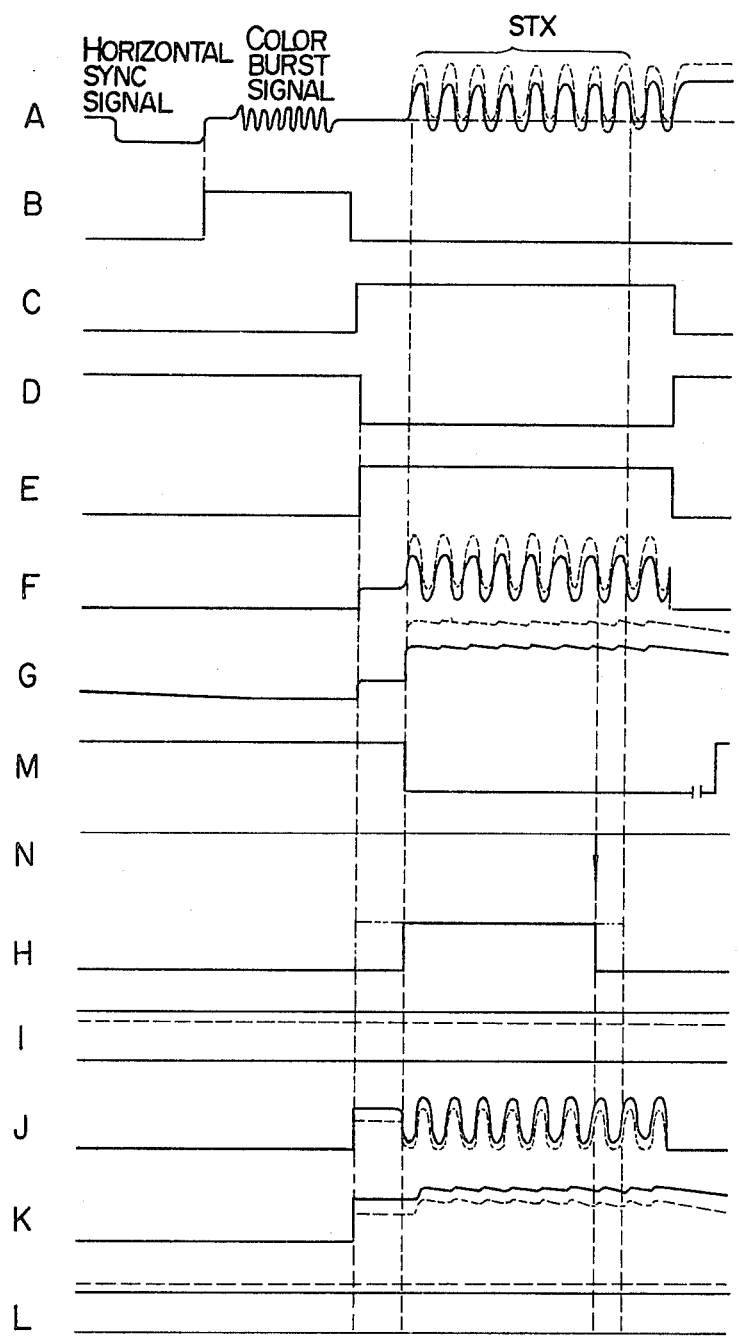

MULTIPLEXED INFORMATION SIGNAL RECEIVING SYSTEM

The present invention relates to a receiving system for receiving a multiplexed bi-level information signal such as a still image video signal which is transmitted in a multiplexed mode during a vertical retrace period of a television signal to reproduce the still image information or the like, and it provides a system capable of exactly reshaping the received signal when it is sliced to reproduce the bi-level signal.

It has been contemplated to superimpose a signal on a television signal during its vertical retrace period to transmit information. As an approach thereto, a still image transmission system for transmitting still image information such as characters or graphic patterns has been proposed. The present invention will be explained as an example of such a system.

In that system, one page of still image to be transmitted consists of 200 (or 208) television horizontal scan lines with each line consisting of 245 bits or picture elements as shown in FIG. 1. When a character image is to be transmitted, one page of character image consists of 8 rows with each row consisting of 26 lines. For the transmission of a graphic pattern image, all of the 208 lines are used while for the transmission of the character image, the upper 18 lines of each row are used for the character pattern and lower 8 lines of each row are used as an inter row space.

The following description is based on the assumption that such a character image is to be transmitted.

In a transmitting station, the character image is sequentially and horizontally scanned from the uppermost line as indicated by a chain line in FIG. 1A to produce a bi-level video signal V for each line as shown in FIG. 1B, which signal is superimposed for each line on any horizontal periods, e.g. 20th horizontal period (in an odd-numbered field) and 283rd horizontal period (in an even-numbered field) during a vertical retrace period of the television signal, as shown in FIG. 1C, for transmitting it in a multiplexed mode.

Furthermore, an 8-bit (4-cycle) start signal STX indicative of a reference phase and a reference amplitude for all of the signals, a 4-bit program code signal PC indicative of a particular program to which the video signal V relates and an 8-bit line number code signal indicative of a particular line number of the video signal V as counted from the top of the image are superimposed and transmitted, in the multiplexed mode, as information signals.

The video signal V is thus sequentially multiplexed one line for each field starting from the uppermost line of the character image, and one page of video signals for one program are superimposed sequentially.

However, no video signal V is superimposed on a field immediately before the transmission of the video signals V of each of the 8 rows for one page of still images, but instead a row code signal indicative of a particular row number and a color code signal indicative of a particular color of that row are superimposed, and one row of video signals V are sequentially transmitted from the next following field. For the row code signals, "225"–"232" which are not to be used as the line number code signals LN are used for the code signals indicative of 1st to 8th rows, respectively, in order to distinguish them from the line number code signals LN, and the row code signals are superimposed at the same position as the line number code signals. The color code signal is superimposed on a front half of the position for the video signal V and it indicates a particular color of each of the characters in that row by 3 bits for each character.

In order to transmit various kinds of images such as news and a weather forecast, it is necessary to increase the number of programs. For example, nine programs are transmitted. In this case, one page of still image video signals are transmitted serially over 208 fields for each program, but when nine programs are transmitted, the serial video signals for each program are grouped as a unit and the still image video signals "#1", "#2", ... "#9" for the nine programs are transmitted in time sequence arrangement as shown in FIG. 1E.

Referring to FIG. 2, a basic configuration of a system for receiving the multiplexed information signals of the still images and displaying them is explained.

In FIG. 2, numeral 1 denotes a receiving circuit for a television signal including a tuner and a video detection circuit, numeral 2 denotes a waveform reshaping circuit for reshaping an output of the receiving circuit 1 into a bi-level signal, numeral 3 denotes a synchronization signal separation circuit, numeral 4 denotes a horizontal oscillation circuit which is synchronized with a horizontal synchronizing signal, and numeral 5 denotes a vertical frequency division circuit which is synchronized with a vertical synchronizing signal.

Numeral 6 denotes a gate pulse generating circuit for generating a sampling gate pulse during the 20th horizontal period (and 283rd horizontal period; hereinafter only the 20th horizontal period is explained and the explanation for the 283rd horizontal period is omitted) in order to extract the multiplexed information signal superimposed on the 20th hoirzontal period. A gate circuit 7 for extracting the signal responds to a gate pulse from the gate pulse generating circuit 6 to extract information signals STX, PC, LN and V at the 20th occurrence from the output of the reshaping circuit 2 and supplies them to an input gate circuit 8.

On the other hand, a program code signal extracting circuit 9 responds to a clock signal from a receiving clock generating circuit 10 to extract the program code signal PC and holds it for one field period. A comparison circuit 11 compares the extracted program code signal PC with a program designation signal from a program instruction circuit 12 and produces an identity signal when both signals are identical to cause the input gate circuit 8 to open to write one line of video signals V into a buffer memory 13.

On the other hand, a line number signal extraction circuit 14 responds to the clock signal from the receiving clock generating circuit 10 to extract the line number signal LN. A line number comparison circuit 15 compares the extracted line number signal LN with a count output from a line counter 16 indicative of a line being scanned and causes a transfer gate 17 to open when both signals are identical so that one line of video signals V stored in the buffer memory 13 are written into memory locations in a main memory 18 corresponding to that line. The main memory 18 is normally a memory circuit having a memory capacity of one page of still images and it is driven by a clock from a main clock generating circuit 19.

By repeating the above receiving and storing operations, the video signals V received at the main memory 18 can be sequentially stored.

Thereafter, during a time interval between the 42nd horizontal period and the 241st horizontal period, for example, readout clocks are supplied to the main member 18 at a rate of 245 bits per horizontal period to read out the stored video signals V, which are then converted to a standard television signal for application to a CRT 22. In this manner, the still image can be displayed as shown in FIG. 3.

The color code signal is extracted by a color code signal extracting circuit 23 in response to the clock signal from the receiving clock generating circuit 10 and stored in a color code memory 24, which controls a chrominance signal generating circuit 25 which operates in synchronism with the readout of the video signals from the main memory 18, to produce a chrominance signal, which is then applied to a processing amplifier 21 to display the characters of the still image on the CRT 22 in a predetermined color.

As described above, in the above system, the still images are transmitted, received and displayed.

The present invention particularly relates to the reshaping circuit 2 of the receiving apparatus of such a system. The reshaping circuit 2 is used to restore the original bi-level waveform of the multiplexed information signal such as a still image video signal which has been distorted to a substantially sinusoidal waveform from a normal binary pulse waveform due to the attenuation of high frequency components of the signal during the transmission thereof or which has been irregularly distorted in amplitude. It slices the signal at a predetermined level to reshape it into the bi-level signal.

In a prior art receiving apparatus of this type, however, the slice level of the reshaping circuit has been fixed or semi-fixed so that an exact bi-level signal could not be reproduced depending on the receiving condition of the signal. That is, although a pedestal level of the television signal is established within a predetermined range of error ($\pm 2.5\%$), its absolute level slightly changes from station to station and the amplitude of the information also materially changes after it has passed through a repeater station. Heretofore, therefore, it has been not possible to attain an optimum slicing operation under all of those receiving conditions.

It is, therefore, an object of the present invention to overcome the drawbacks encountered in the prior art apparatus and provide an apparatus capable of exactly reshaping the received signal while automatically correcting a slice level during reshaping by controlling a D.C. level of an input signal to a slice circuit through a feedback circuit depending on the received signal condition.

In order to achieve the above object, in accordance with the present invention, there is provided a receiving apparatus for receiving a television signal on which a bi-level information signal is superimposed in vertical retrace periods and slicing the received information signal to reshape it into a bi-level signal, characterized by an upper level detecting circuit for detecting an upper level of a start signal indicative of a reference phase and a reference amplitude, inserted at a leading portion of the information signal, and a lower level detecting circuit for detecting a lower level of the start signal, outputs from the lower and upper level detecting circuits being fed back to an amplifier/processing circuit to control a D.C. level of an input signal to the slice circuit to automatically control a relative relation between the information signal in the slice circuit and a reference level in the slice circuit to a predetermined level, whereby exact slicing operation is carried out to reproduce a proper information signal.

In the accompanying drawings:

FIGS. 1A exemplarily illustrates character images to be transmitted;

FIGS. 9, 10A and 10B show other embodiments of circuits for detecting upper and lower levels of a reference start signal;

FIG. 11 shows waveforms at various points in the circuits of FIGS. 9 and 10;

Figure 1:
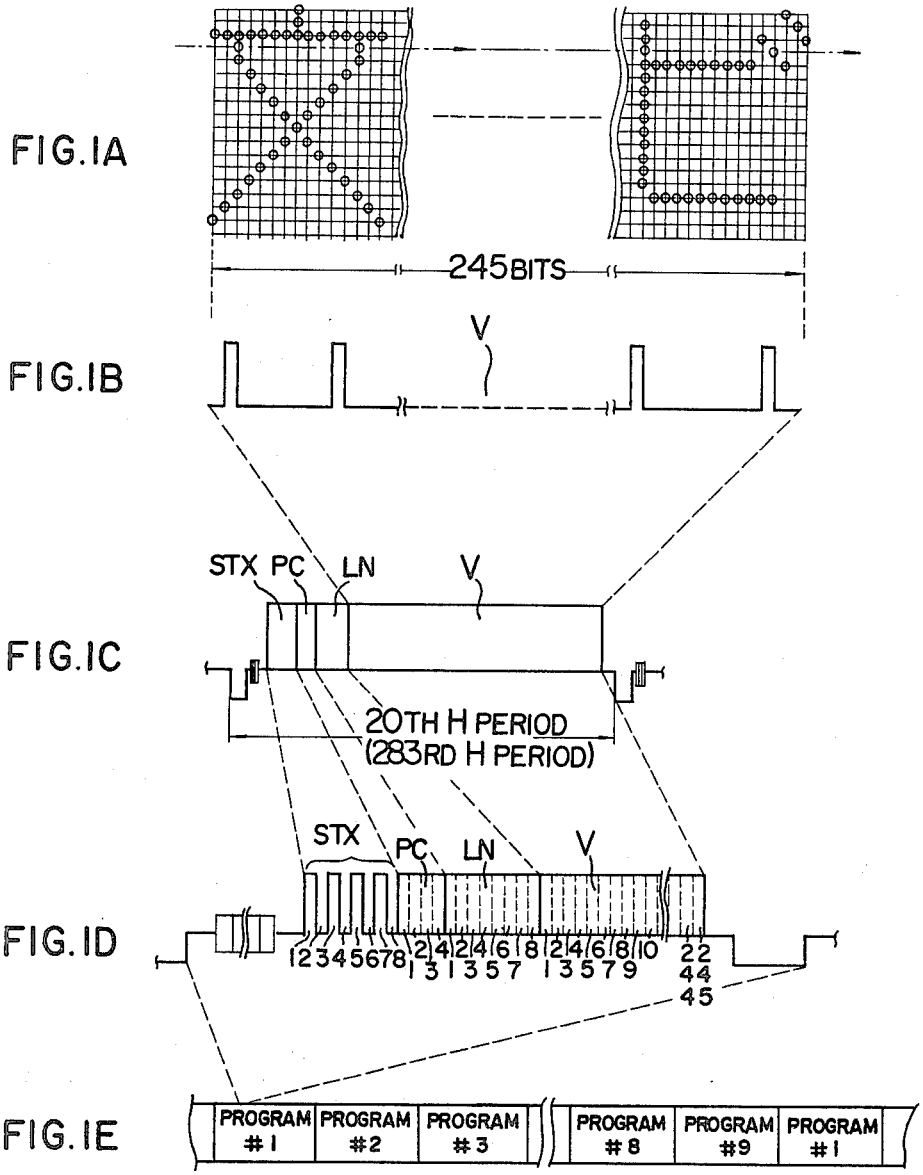
FIG. 1B illustrates signals for one line of images.
FIGS. 1C and 1D illustrate the superposition of the line of video signals on vertical retrace periods.
FIG. 1E illustrates a multiplexed information signal pattern.
Figure 2:
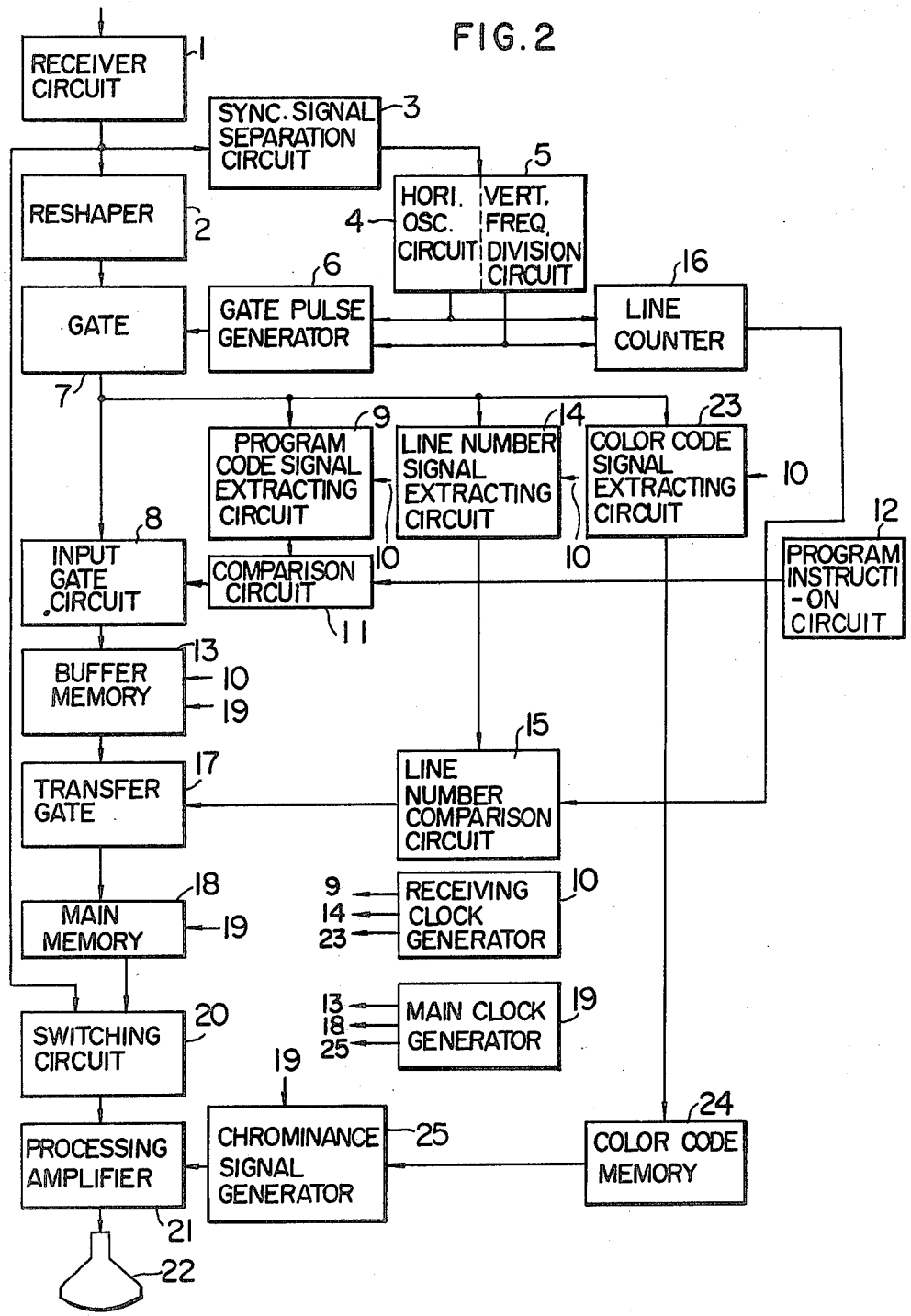
FIG. 2 shows a basic configuration of a still image receiving and displaying apparatus.
Figure 3:
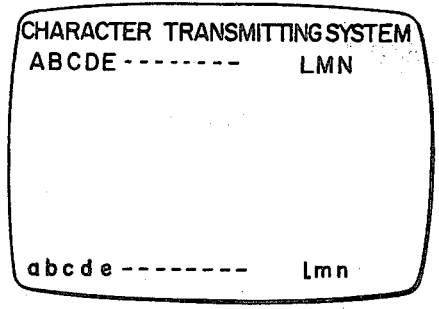
FIG. 3 illustrates display of a still image.
Figure 4:
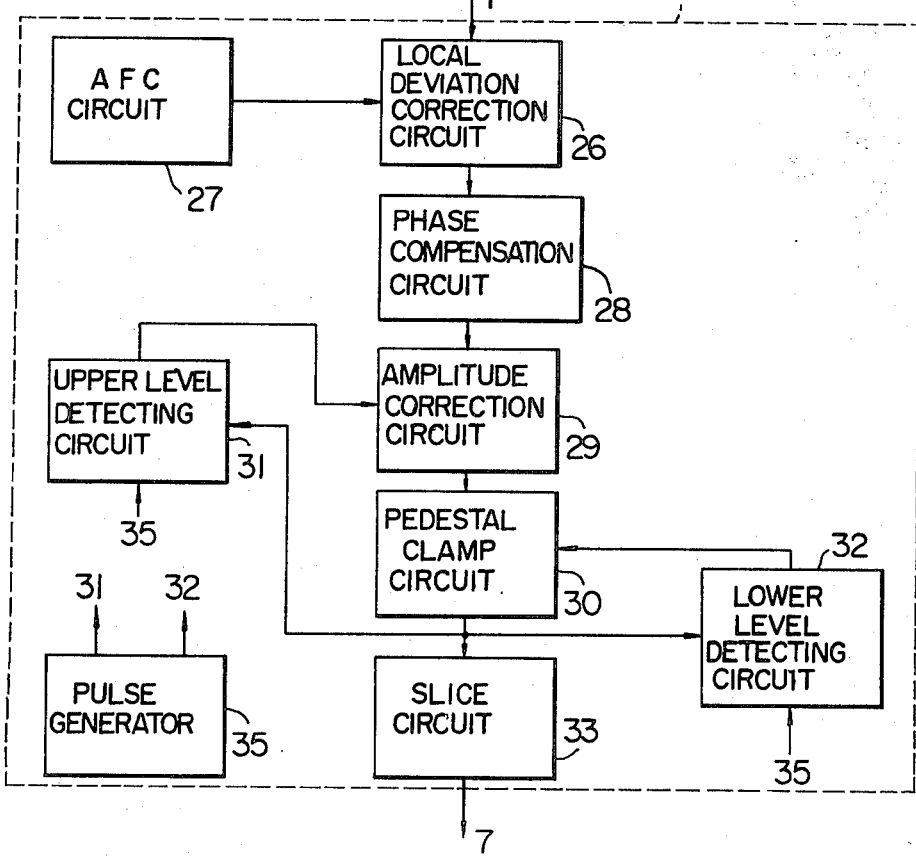
FIG. 4 shows a block diagram of a reshaping circuit in accordance with the present invention.
Figure 5A:
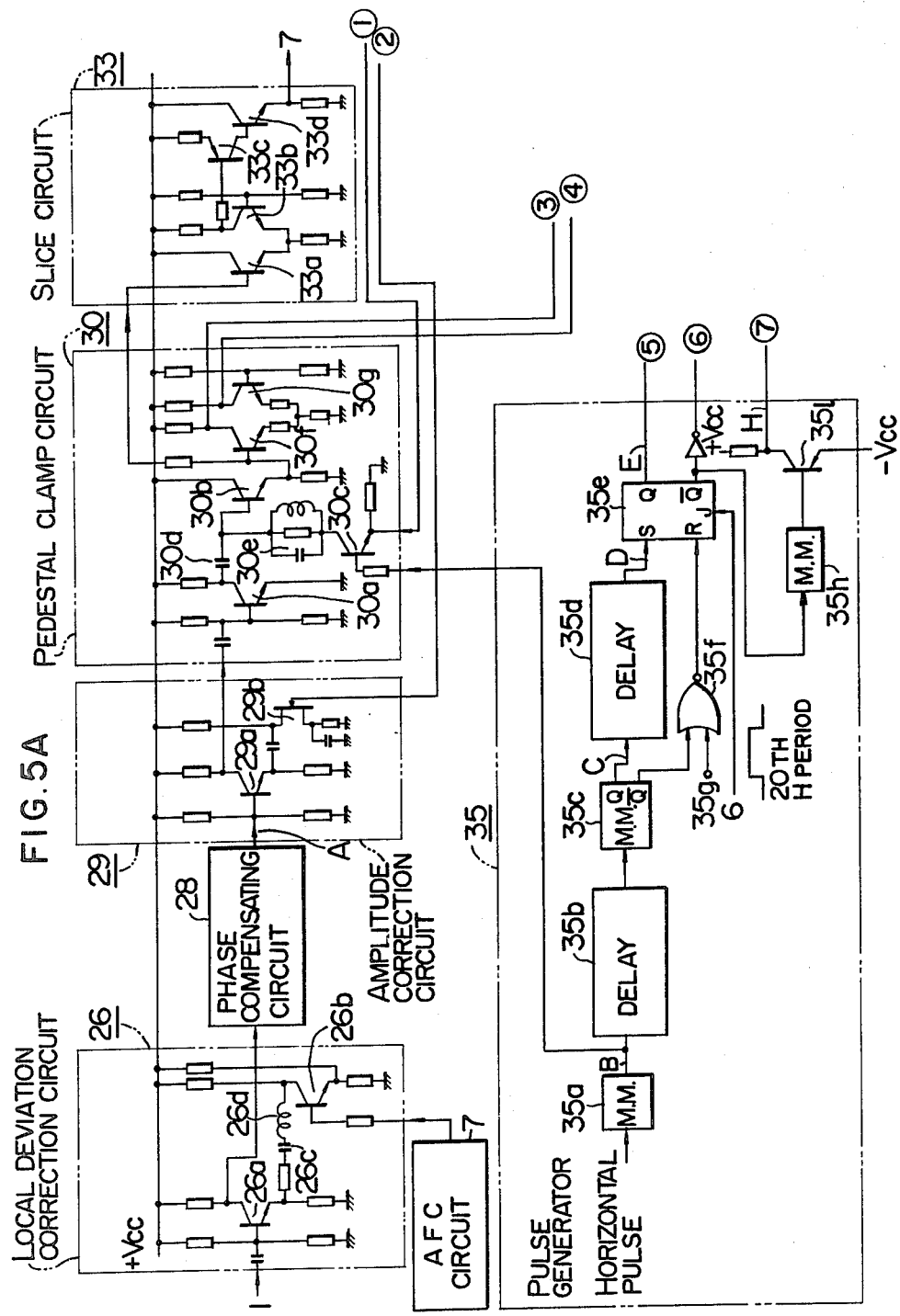
FIGS. 5A and 5B show a specific circuit diagram of the circuit of FIG. 4.
Figure 5B:
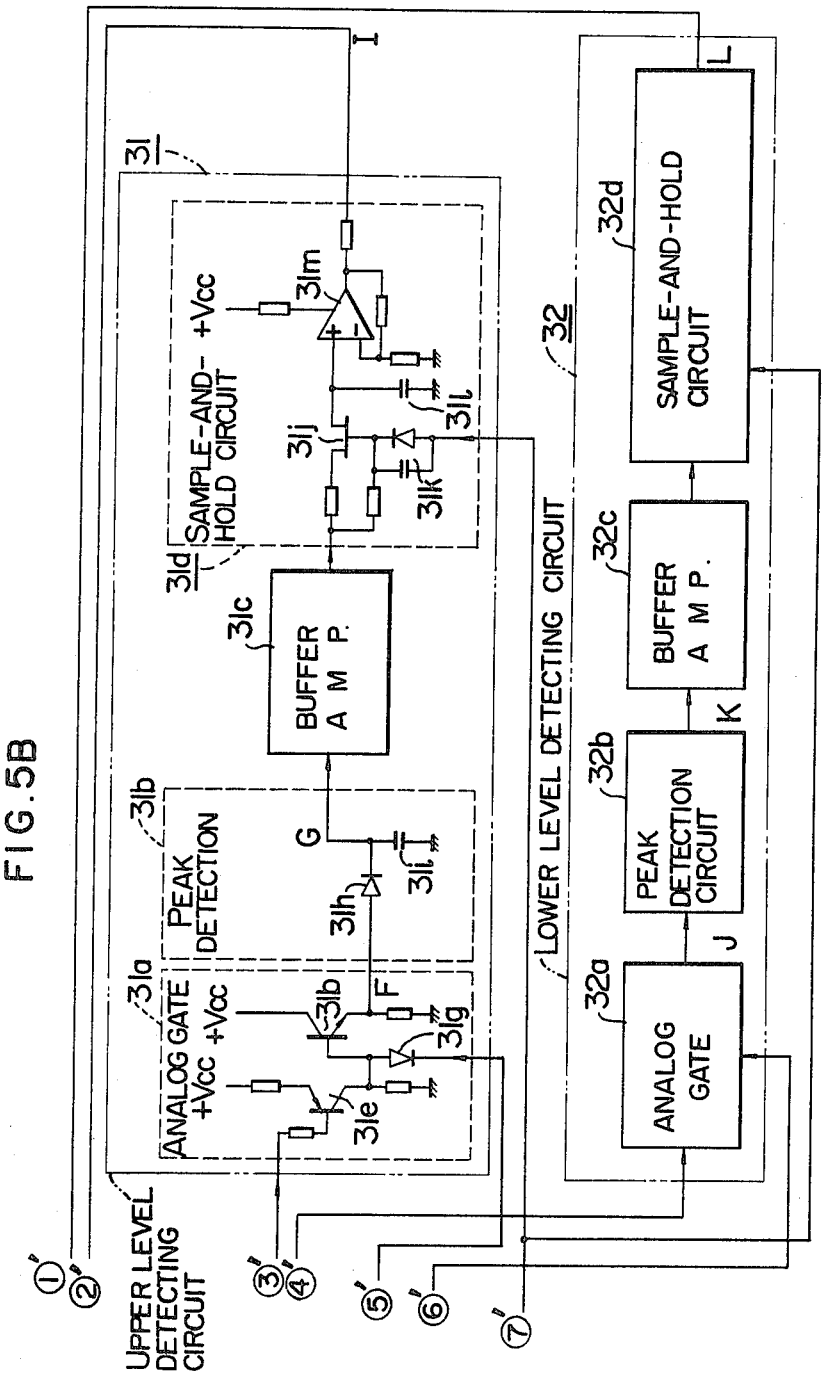

Now, referring to FIGS. 4 to 8 which show a preferred embodiment of the present invention, the present invention will be explained in detail. FIG. 4 is a block diagram of the reshaping circuit 2 which is a characteristic of the present invention, FIGS. 5A and 5B show a specific circuit diagram thereof and FIGS. 6 to 8 show waveforms and a characteristic curve for explaining the operation of the circuit.

In FIG. 4, a television signal including a multiplexed information signal such as a still image video signal received gy the receiving circuit 1 is first applied to a local deviation correction circuit 26 in which high frequency components of the signal are automatically adjusted by an AFC voltage from an AFC circuit 27 so that the amplitude of the multiplexed information signal is not affected by the deviation of a local oscillation frequency in a tuner of the receiving circuit 1.

Figure 6:
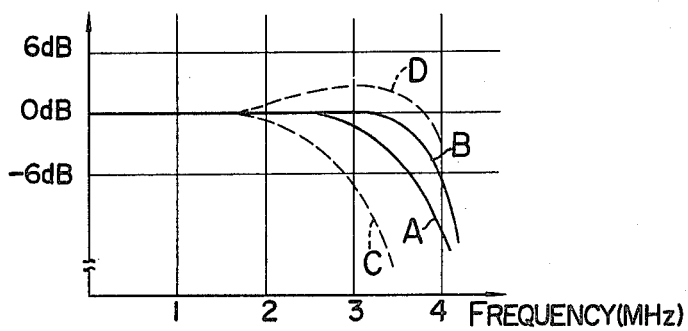
FIG. 6 shows a frequency characteristic of the receiving circuit of FIG. 2.
Figure 7A:
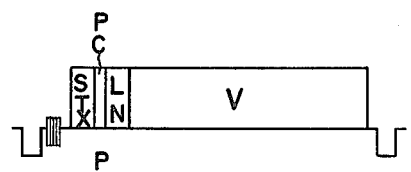
FIGS. 7A to 7G illustrate variations of D.C. level and amplitude of a transmitted information signal.

FIG. 6 illustrates a manner of adjustment, in which a curve A represents a frequency characteristic of the receiving circuit 1 when the local oscillation frequency is proper and the receiving circuit 1 terminates at a video detection circuit of a standard television receiver. On the other hand, in a currently proposed system, a basic frequency of the still image video signal as the information signal is considerably high, for example, 2.86 MHz, and many higher frequency components are included because of the bi-level pulse signal. Accordingly, it is desirable to somewhat expand the high frequency characteristic as shown by a curve B in FIG. 6. The local deviation correction circuit 26 is designed to impart the characteristic of B.

On the other hand, if the local oscillation frequency in the tuner shifts to a lower side, the frequency charactersitic of the signal produced by the receiving circuit 1 has its high frequency components attenuated as shown by a curve C in FIG. 6 so that the high frequency components of the information signal are attenuated and the amplitude thereof is also attenuated. Conversely, if the local oscillation frequency shifts to a higher side, a frequency characteristic of the resulting signal has its high frequency components enhanced too much as shown by a curve D in FIG. 6 so that a waveform distortion such as ringing occurs and the amplitude of the signal increases. The shift of the local oscillation frequency is normally in the range of ±50–100 KHz even when the AFC of the tuner operates properly, and it may further shift by aging. Therefore, a countermeasure for the local deviation is necessary.

Accordingly, in the present system, a deviation in the local oscillator frequency is preliminarily corrected. To this end, the derivation of the local oscillation frequency is detected by the AFC voltage of the AFC circuit 27 and if the local oscillation frequency shifts to the lower side the high frequency characteristic of the local deviation correction circuit 26 is enhanced, and if the local oscillation frequency deviates to the higher side the high frequency characteristic of the local deviation correction circuit 26 is suppressed so that the frequency characteristic always approximates the ideal characteristic B shown in FIG. 6 for automatically compensating for amplitude variations and waveform distortion due to the shift or deviation of the local oscillation frequency.

After having been compensated for signal changes due to the local deviation, the signal is phase-compensated in a phase compensation circuit 28 and the applied to correction circuits to be described. The phase compensation circuit 28 is provided to compensate for any phase shift resulting from the tuner, the video intermediate frequency amplifier and the video envelope detector, and it may be similar one to the phase compensation circuits used in a conventional video linear detector circuit.

The signal in this stage is generally stabilized by the functions of an AGC circuit in the receiving circuit 1 and the local deviation correction circuit 26 described above, but when considering only the multiplexed signal, the D.C. level and the amplitude thereof may fluctuate as shown in FIG. 7 due to the variations in a broadcasting station or a repeater station and the distortion in the course of the transmission. FIG. 7A shows a level diagram under a normal transmission condition, in which an upper level u is at a predetermined level and a lower level l is also at a predetermined pedestal level. Under this condition, the signal can be exactly reshaped to reproduce the bi-level signal by establishing a slice level s at exactly midpoint of both levels.

Figure 7B:
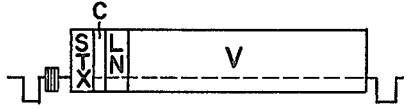
Figure 7C:
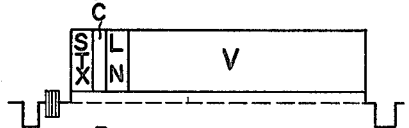
Figure 7D:
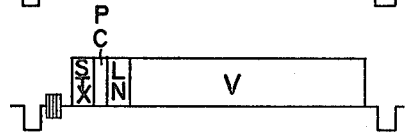
Figure 7E:
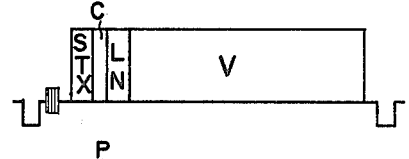

FIG. 7B shows a level diagram when the D.C. level of the information signal falls so that both the upper level u' and the lower level l' are lowered, FIG. 7C shows a level diagram when the D.C. level rises so that both the upper level u' and the lower level l' are lifted, FIG. 7D shows a level diagram when the amplitude is so small that the upper level u' is lowered, and FIG. 7E shows a level diagram when the amplitude is so large that the upper level u' is lifted. Of course, a combination of the cases illustrated above may occur and FIG. 7F shows an example of such a combination in which the D.C. level falls and the amplitude is too small so that both the upper level u' and the lower level l' are lower.

The upper level and the lower levels for the signal herein used indictate the upper and lower levels, respectively, for those portions in which the bits are to have constant levels irrespective of the content of the still image to be transmitted. In those portions where the levels of the bi-level signal change depending on the contents of the still image, the upper and lower levels change depending on the content. Basically, it is appropriate to use the upper and lower levels at the upper and lower points of the start signal STX. FIG. 7G illustrates such a relation. When a predetermined framing code is inserted following the start signal STX, the above portion may include the framing code.

When the D.C. level and/or the amplitude of the information signal vary, the slice circuit cannot exactly slice the signal and the resulting bi-level signal may be inacurate.

In the present system, therefore, the information signal is first applied to an amplitude correction circuit 29 to correct the amplitude, and in a pedestal clamp circuit 30 the lower level of the signal is clamped to a predetermined level to produce a signal having constant amplitude and D.C. level. Thereafter, this signal is reshaped. To this end, an upper level detecting circuit 31 detects the upper level of the start signal STX in the information signal supplied from the output of the pedestal clamp circuit 30 and the detection output of the upper level detecing circuit 31 is fed back to the amplitude correction circuit 29 to control the amplitude of the information signal so that the upper level of the information signal is always maintained at a constant level. On the other hand, a lower level detecting circuit 32 detects the lower level of the start signal STX in the output of the pedestal clamp circuit 30 and the detection output of the lower level detecting circuit 32 is fed back to the pedestal clamp circuit 30 to control the clamp level so that the lower level of the information signal is always maintained at a constant level.

In this case, although the upper level control by the upper level detecting circuit 31 and the amplitude correction circuit 29 and the lower level control by the lower level detecting circuit 32 and the pedestal clamp circuit 30 interact with each other to somewhat change each of the levels, those controls proceed simultaneously and provide sufficient control sensitivities so that the upper level and the lower level are finally controlled to the predetermined levels and the information having controlled D.C. level and amplitude is produced.

Figure 7F:
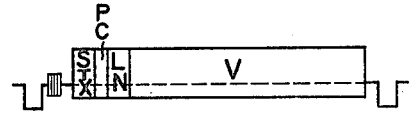
Figure 7G:
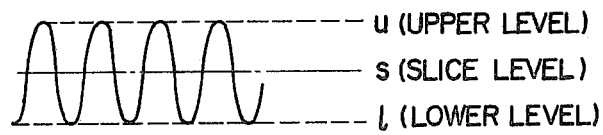
Figure 8:
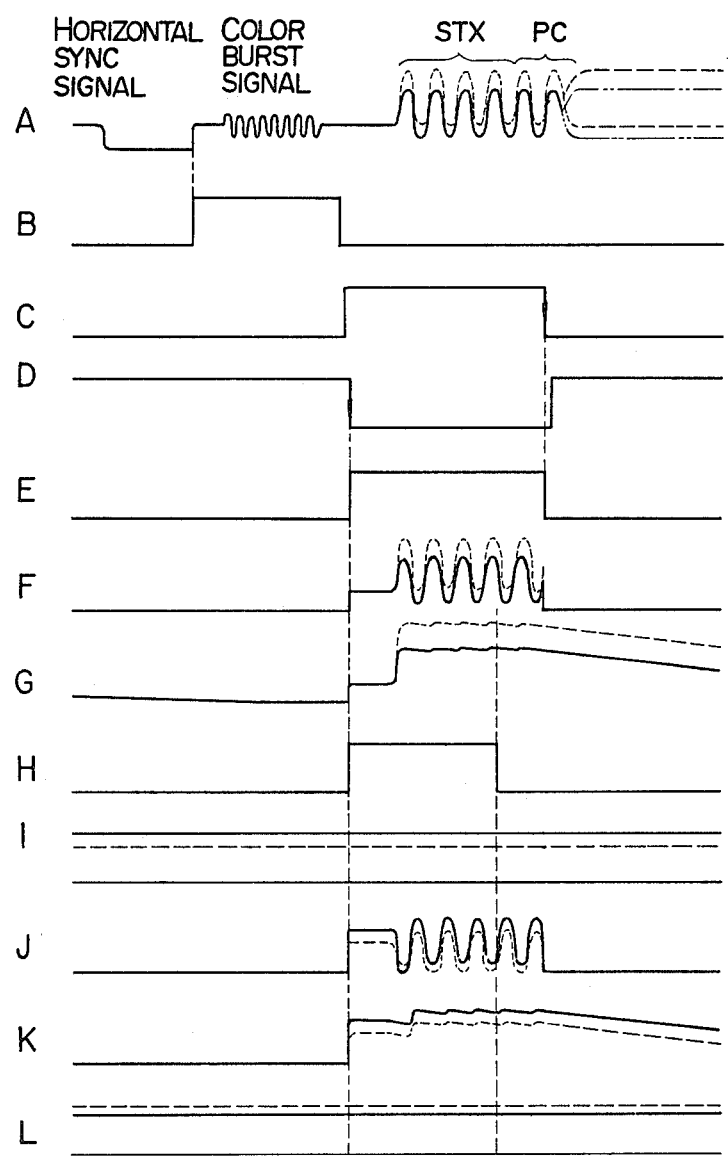
FIG. 8 shows waveforms at various points in the circuit of FIG. 5.

For example, when the signal as shown in FIG. 7F is received, the amplitude is increased by the upper level detecting circuit 31 and the amplitude correction circuit 29 so that the upper level u' is corrected to u, and the pedestal clamp level is raised by the lower level detecting circuit 32 and the pedestal clamp circuit 30 so that the lower level l' is corrected to l. As a result, the information signal having the correct D.C. level and amplitude as shown in FIG. 7A is produced.

After the D.C. level and amplitude of the information signal have been corrected in the manner described above, the information signal is applied to the slice circuit 33 where it is sliced at a substantially middle slice level s to produce the exact bi-level information signal.

Numeral 35 denotes a pulse generating circuit which supplies a gate pulse and a sampling pulse to the upper level detecting circuit 31 and the lower level detecting circuit 32 to extract the start signal STX.

Referring to FIG. 5, a specific circuit configuration of the circuit of FIG. 4 is now explained.

The local deviation correction circuit 26 comprises a variable high frequency gain amplifier circuit. Numeral 26a denotes an amplifying transistor and 26b denotes a high frequency gain controlling transistor. A series resonance circuit including a capacitor 26c and a coil 26d and having a resonance frequency at or higher than a fundamental frequency (e.g. 2.86 MHz) of the information signal is connected to an emitter circuit of the transistor 26a, and the transistor 26b is connected to the other terminal of the series resonance circuit, and an AFC voltage from the AFC circuit 27 is applied to a base of the transistor 26b. A bias voltage to the transistor 26b is so selected that the circuit assumes the frequency characteristic as shown by the curve B in FIG. 6 when the AFC voltage in the absence of the deviation of the local oscillation frequency form the AFC circuit 27 is applied to the transistor 26b. When the local oscillation frequency shift to the lower side, the AFC voltage from the AFC circuit 27 increases and an internal impedance of the transistor 26b decreases so that the amplification factor at the high frequency increases to enhance the high frequency characteristic in the curve C of FIG. 6. Conversely, when the local oscillation frequency shifts to the higher side, the AFC voltage from the AFC circuit 27 decreases and the internal impedance of the transistor 26b increases so that the amplification factor at the high frequency decreases to suppress the high frequency characteristic in the curve D of FIG. 6. In this manner, the frequency characteristic is always compensated to be close to the ideal characteristic B in FIG. 6.

The amplitude correction circuit 29 comprises a variable gain amplifier circuit which includes an amplifying transistor 29a and a gain controlling FET 29b connected to an emitter of the transistor 29a. A receiving information signal as shown in FIG. 8A is applied to a base of the transistor 29a from the phase compensation circuit 28. A detection output as shown in FIG. 8I which is derived from the upper level detecting circuit 31 by detecting the upper level of the start signal STX is applied to a gate of the FET 29b to change an internal impedance of the FET 29b for controlling an amplification factor of the transistor 29a to control the amplitude of the information signal so that the upper level of the information signal is always maintained at the predetermined level.

The pedestal clamp circuit 30 is a soft clamp circuit which comprises buffer amplifying transistors 30a and 30b, a switching transistor 30c and a clamping capacitor 30d. A tuning circuit 30e tuned to a color subcarrier frequency is provided for soft clamping. A clamp pulse including leading and trailing portions of a color burst signal, as shown in FIG. 8B, is applied to a base of the transistor 30c from the pulse generating circuit 35 to render the transistor 30c conductive during the duration of the clamp pulse to clamp the pedestal level of the signal to an emitter potential of the transistor 30c. (where a collector-emitter saturation voltage is neglected). A detection signal as shown in FIG. 8L which is derived by detecting the lower level is applied to the emitter of the transistor 30c to control the clamp level of the signal so that the lower level of the information signal is always maintained at the predetermined level.

A signal derived from an emitter of the transistor 30b is applied to the slice circuit 33 and also applied to a differential amplifier comprising transistors 30f and 30g to produce signals of opposite polarity to each other, which are then applied to the upper level detecting circuit 31 and the lower level detecting circuit 32.

The upper level detecting circuit 31 comprises an analog gate 31a, a peak detection circuit 31b, a buffer amplifier 31c and a sample-and-hold circuit 31d.

In the analog gate 31a, transistors 31e and 31f and a diode 31g constitute the gate circuit and one polarity of information signal from the pedestal clamp circuit 30 is applied to a base of the transistor 31e. On the other hand, a gate pulse, as shown in FIG. 8E, from the pulse generating circuit 35 is applied through the diode 31g to activate the transistor 31f only for the duration of the gate pulse to extract only the portion of the start signal STX as shown in FIG. 8F.

The extracted signal is applied to the peak detection circuit 31b which includes a diode 31h and a capacitor 31i and it is peak-detected thereby producing an output corresponding to the upper level of the start signal STX as shown in FIG. 8G. The peak-detected output is amplified by the buffer amplifier 31c and then applied to the sample-and-hold circuit 31d.

The sample-and-hold circuit 31d comprises sampling FET 31j and diode 31k, a holding capacitor 31l and a buffer amplifier 31m, and it responds to a sampling pulse, as shown in FIG. 8H, supplied from the pulse generating circuit 35 through the diode 31k to sample the upper level voltage during the start signal STX and hold it in the capacitor 31l. Since the buffer amplifier 31m is a high input impedance circuit, it produces a D.C. voltage detection output which is derived by detecting the high level, as shown in FIG. 8I. The upper level detection output I becomes smaller as the high level of the start signal STX rises.

Thus, the upper level detection output I is applied to the gate of the FET 29b in the amplitude correction circuit 29 to increase the internal impedance of the FET 29b when the upper level is higher to reduce the gain of the transistor 29a and lower the upper level, by decreasing the amplitude and conversely to reduce the internal impedance of the FET 29b when the upper level is lower to increase the gain of the transistor 29a and raise the upper level by increasing the amplitude. In this manner, the upper level of the start signal STX is always controlled to the predetermined level.

On the other hand, the lower level detecting circuit 32 is of the same circuit configuration as the upper level detecting circuit except that an input signal of opposite polarity is applied from the pedestal clamp circuit 30 and an output polarity is inverted. It comprises an analog gate 32a, a peak detection circuit 32b, a buffer amplifier 32c and a sample-and-hold circuit 32d.

Accordingly, in the lower level detecting circuit 32, an input signal of opposite polarity to that of FIG. 8A is gated by a gate pulse, as shown in FIG. 8E, from the pulse generating circuit 35 to extract the start signal STX in the opposite polarity as shown in FIG. 8J. The extracted signal is then peak-detected by the peak detection circuit 32b to produce a detection output as shown in FIG. 8K, which is then sampled and held during the duration of the start signal STX by the sample-and-hold circuit 32d in response to a sampling pulse as shown in FIG. 8H to produce a lower level detection output as shown in FIG. 8L. The lower level detection signal L becomes larger as the lower level of the start signal STX falls.

The lower level detection output L is then applied to the emitter of the transistor 30c of the pedestal clamp circuit 30 to raise the pedestal clamp level when the lower level is lower and to lower the pedestal clamp level when the lower level is higher. In this manner, the lower level of the start signal STX is always maintained at the predetermined level.

In this manner, both the upper level and lower level of the information signal are controlled to the predetermined levels so that the information signal having the predetermined D.C. level and amplitude is produced from the pedestal clamp circuit 30 and it is then applied to the slice circuit 33. The slice circuit 33 slices the signal by a differential amplifier comprising transistors 33a and 33b to reshape it into a bi-level signal. The slice level thereof is determined by a base bias voltage of the transistor 33b. The reshaped information signal is taken from transistors 33c and 33d and supplied to a signal processing circuit starting from the gate circuit 7.

The pulse generating circuit 35 generates the gate pulses and sampling pulses for the circuits described above. It triggers a monostable multivibrator 35a by a horizontal pulse such as a flyback pulse to produce the pedestal clamping pulse which occurs prior to a still image video signal and extends over a color burst signal period as shown in FIG. 8B. This pulse is supplied to the base of the transistor 30c in the pedestal clamp circuit 30. This pulse is also applied to a delay circuit 35b where it is slightly delayed, and a trailing edge of the delayed pulse triggers a monostable multivibrator 35c to produce a pulse which extends over the period of the start pulse STX as shown in FIG. 8C. The pulse C is further delayed by a delay circuit 35d as shown in FIG. 8D and a leading edge of the delayed pulse sets a flip-flop 35e while it is reset by a trailing edge of the output pulse C from the monostable multivibrator 35c through a NOR gate 35f. A gate pulse which is produced only in the 20th horizontal period of the output from the gate pulse generating circuit 6 is applied to a J-terminal of the flip-flop 35e to activate it only in the 20th horizontal period. In this manner, the flip-flop 35e produces the gate pulse as shown in FIG. 8E.

The NOR gate 35f functions to reset the flip-flop 35e when a detection output for a framing code signal is applied to a terminal 35g. An input to the terminal 35g is normally low level signal. When no framing code signal is used, the NOR gate 35f is omitted. A leading edge of an output pulse at a $\overline{Q}$-terminal of the flip-flop 35e triggers a monostable multivibrator 35h, an output of which is amplified by a transistor 35l to produce a sampling pulse which terminates during the duration of the start signal STX as shown in FIG. 8H.

While the amplitude correction circuit 29 and the pedestal clamp circuit 30 are arranged in this order in the illustrated embodiment, they may be arranged in the opposite order.

Furthermore, while the circuit is designed such that the gain of the amplitude correction circuit 29 is controlled by the detection output of the upper level detecting circuit 31 and the clamp level of the pedestal clamp circuit 30 is controlled by the detection output of the lower level detecting circuit 32, the relation may be inverted, that is, the clamp level may be controlled by the upper level detection output and the amplitude may be controlled by the lower level detection output to control the signal level to the predetermined level.

In this manner, the upper level and the lower level of the start signal STX are detected to allow reshaping of the signal at the exact slice level.

Figure 9:
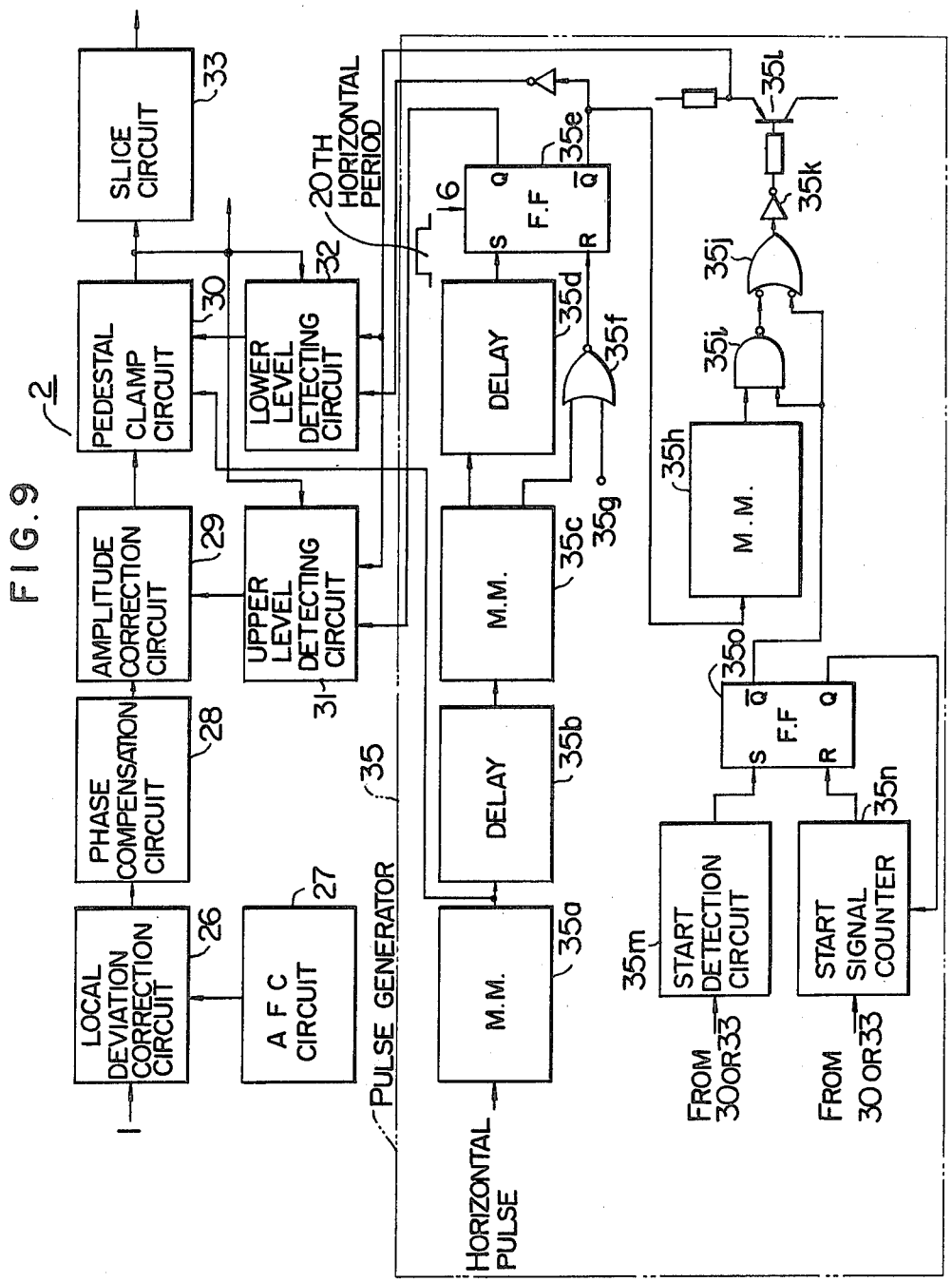
Figure 10B:
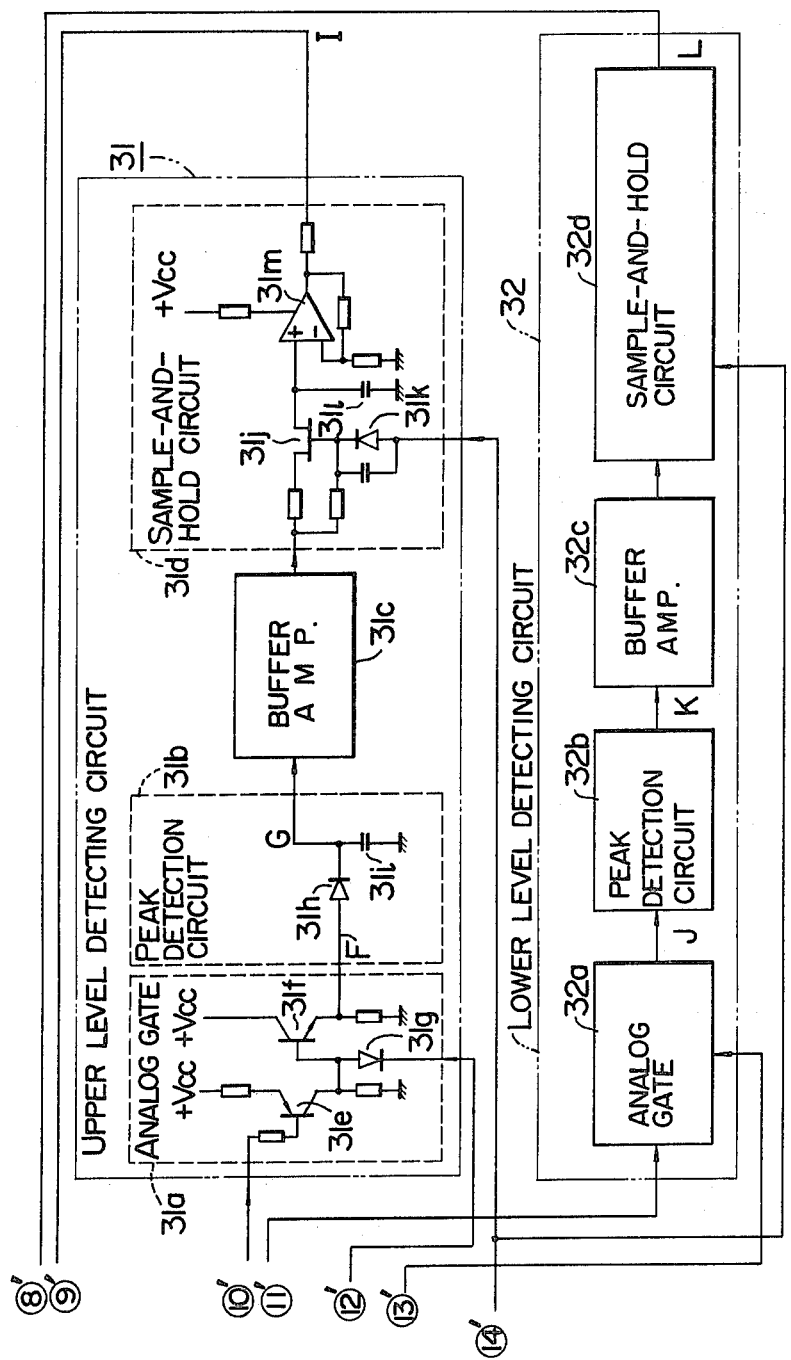

Referring to FIGS. 9, 10A and 10B, a second embodiment which can carry out the control more exactly in the apparatus described above is explained.

Needless to say, it is necessary to exactly detect the upper level and the lower level in the upper level detecting circuit 31 and the lower level detecting circuit 32 in order to attain the exact operation of the apparatus. Among others, it is ncessary to assure that the sampling operations of the sample-and-hold circuits 31d and 32d in the detecting circuits 31 and 32, respectively, are carried out during the duration of the start signal STX. The monostable multivibrator 35h described above is usually used to generate the sampling pulse for use in such a sampling operation, but, in this case, the timing of the generation of the sampling pulse is apt to be changed with variations of the horizontal pulse and a meta-stable period of the monostable multivibrator is likely to be changed by temperature change or power supply variations. Consequently, the operation is unstable.

In the second embodiment of the present invention, the sampling pulse for detecting the upper level and the lower level is produced by using the start signal of the received information signal to attain the exact level detection.

Namely, the start signal in the information signal is detected and the sampling pulse is started at the beginning of the start signal. The number of the start signals is counted and when a predetermined count has been counted the sampling pulse is terminated. With this arrangement, the sampling pulse is always generated only during the duration of the start signal and the sampling pulse can be used to sample the upper level and the lower level to assure the exact detection of the levels of the start signal.

The preferred embodiment is now explained with reference to the drawings. In FIGS. 9, 10A and 10B numeral 35m denotes a start detection circuit, 35n denotes a start signal counting circuit, and 35o denotes a flip-flop for generating the sampling pulse. The start detection circuit 35m detects the beginning of the start signal STX at the leading edge of the information signal by peak-detecting the received information signal supplied from the pedestal clamp circuit 30 or the received signal after having been reshaped and supplied from the slice circuit 33, to produce the beginning detection output as shown in FIG. 11M. A leading edge of the beginning detection output M sets the flip-flop 35o.

On the other hand, the start signal counting circuit 35n is counted up during the duration of the start signal STX and produces a predetermined count output, as shown in FIG. 11N, at the end of the start signal STX. When the start signal STX is a 16-bit signal and only the leading edge or trailing edge thereof is counted, the predetermined count is set to a count no larger than 8, and when both the leading edge and the trailing edge are counted, the count is set no larger than 16. Since there may be an error in the detection of the beginning, it is preferable to set the count to 5–7 in the former case and 10–15 in the latter case. It should be understood that the count is changed depending on the number of bits of the start signal STX.

By setting and resetting the flip-flop 35o by the beginning detection signal M and the count output N for the start signal STX, the sampling pulse is terminated during the duration of the start signal STX as shown by a solid line in FIG. 11H so that a sampling pulse having no variation in the timing of its occurrence is produced.

Thus, by using this pulse to detect the upper and lower levels, very exact and stable detection can be attained.

In the present embodiment, in order to generate a temporary sampling pulse, a leading edge of an output pulse at a $\overline{Q}$-terminal of the flip-flop 35e triggers the monostable multivibrator 35h, an output of which is applied to the transistor 35l through a NAND gate 35i, a negative logic NOR gate 35j and an inverter 35k and amplified by the transistor 35l to produce the temporary sampling pulse, as shown by a double dot chain line in FIG. 11H, which, as a rule, terminates within the duration of the start signal STX.

The NAND gate 35i and the negative logic NOR gate 35j function to cause the output from the flip-flop 35o to be taken as the sampling pulse with a higher priority than the output from the monostable multivibrator 35h and cause the output of the monostable multivibrator 35h to be taken as the sampling pulse when no output is produced by the flip-flop 35o.

The approach of producing the sampling pulse by detecting the start signal STX as described above provides an effect of very exact operation, but, at the same time, it includes an inconvenience that no sampling pulse may be produced if an electric field strength of the received television signal is so low and the amplitude of the information signal containing the start signal STX is so small that a predetermined level of detection output is not produced. In such a case, the output from the monostable multivibrator 35h may be used to detect the upper and lower levels to raise the level of the information signal to the predetermined level although the operation is less stable. If the condition is subsequently recovered to allow the detection of the start signal STX, a stable output from the flip-flop 35o may be used for sampling. With this arrangement, good receiving condition can be maintained even under a low electric field strength.

Figure 12:
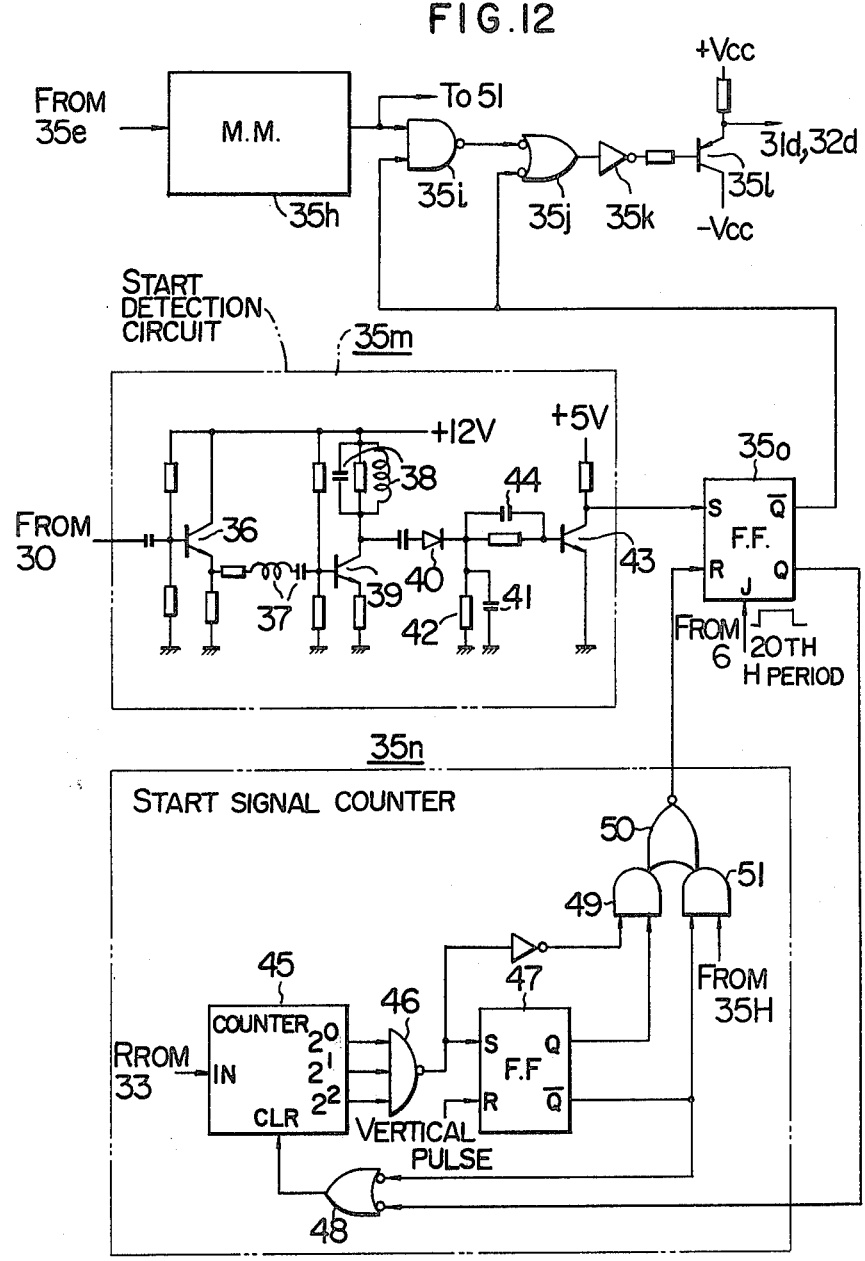
FIG. 12 shows an embodiment of a sampling pulse generating circuit.

Referring to FIG. 12, a specific embodiment of the sampling pulse generating circuit is explained. In the start detection circuit 35m, the received television signal from the pedestal clamp circuit 30 or slice circuit 33 is applied to a buffer amplifying transistor 36, an output from which is then applied to a band amplifying transistor 39 to which a series resonance circuit 37 and a parallel resonance circuit 38 tuned to a fundamental frequency of the start signal STX of the information signal are connected, the extract only the fundamental frequency component of the information signal. As a result, the start signal STX portion is extracted in the form of sine wave. It is then applied to a peak detection circuit comprising a diode 40, a capacitor 41 and a resistor 42 and peak-detected thereby. The detected output is used to switch a transistor 43. Numeral 44 denotes a speed-up capacitor. In this manner, the beginning detection output as shown in FIG. 11M is produced at a collector of the transistor 43, and it is used to set the flip-flop 35o.

On the other hand, in the start signal counting circuit 35n, the information signal from the pedestal clamp circuit 30 or the slice circuit 33 is applied to a counter 45. When the counter 45 counts the start signal STX up to the count of 7, a NAND gate 46 produces an output which in turn sets the flip-flop 47. The counter 45 is cleared by an output from a negative logic NOR gate 48 to which a $\overline{Q}$-output of the flip-flop 47 and a Q-output of the flip-flop 35o are applied. Therefore, the counter 45 is operable only when the flip-flop 47 is in its reset condition and the flip-flop 35o is in its set condition to start to count from the time point when the start signal STX is detected at the leading edge of the information signal and the flip-flop 35o is set. When the counter 45 has counted the start signal STX up to the count of 7, the flip-flop 47 is set so that an AND gate 49 produces a count output as shown in FIG. 11N, which resets the flip-flop 35o through a NOR gate 50. At the same time, the counter 45 is cleared by the $\overline{Q}$-output of the flip-flop 47 through the negative logic NOR gate 48. A vertical pulse is applied to a reset terminal of the flip-flop 47 to reset it so that the above operation is repeated at the 20th horizontal period in each field. A gate pulse which assumes a high level only in the 20th horizontal period is applied to a J-terminal of the flip-flop 35o from the gate pulse generating circuit 6 to assure that the sampling pulse is generated only in the 20th horizontal period.

An AND gate 51 is provided for protection purpose in case the counter 45 does not count the start signal STX up to 7 when the start signal partially fails under a low electric field strength condition. In such a case, if the AND gate 51 is not provided, the flip-flop 35o may be kept set and may not be reset. The AND gate 51 functions to gate the output from the monostable multivibrator 35h to reset the flip-flop 35o to prevent the end of the sampling pulse from being later than that shown by a double dot chain line in FIG. 11H.

Figure 13:
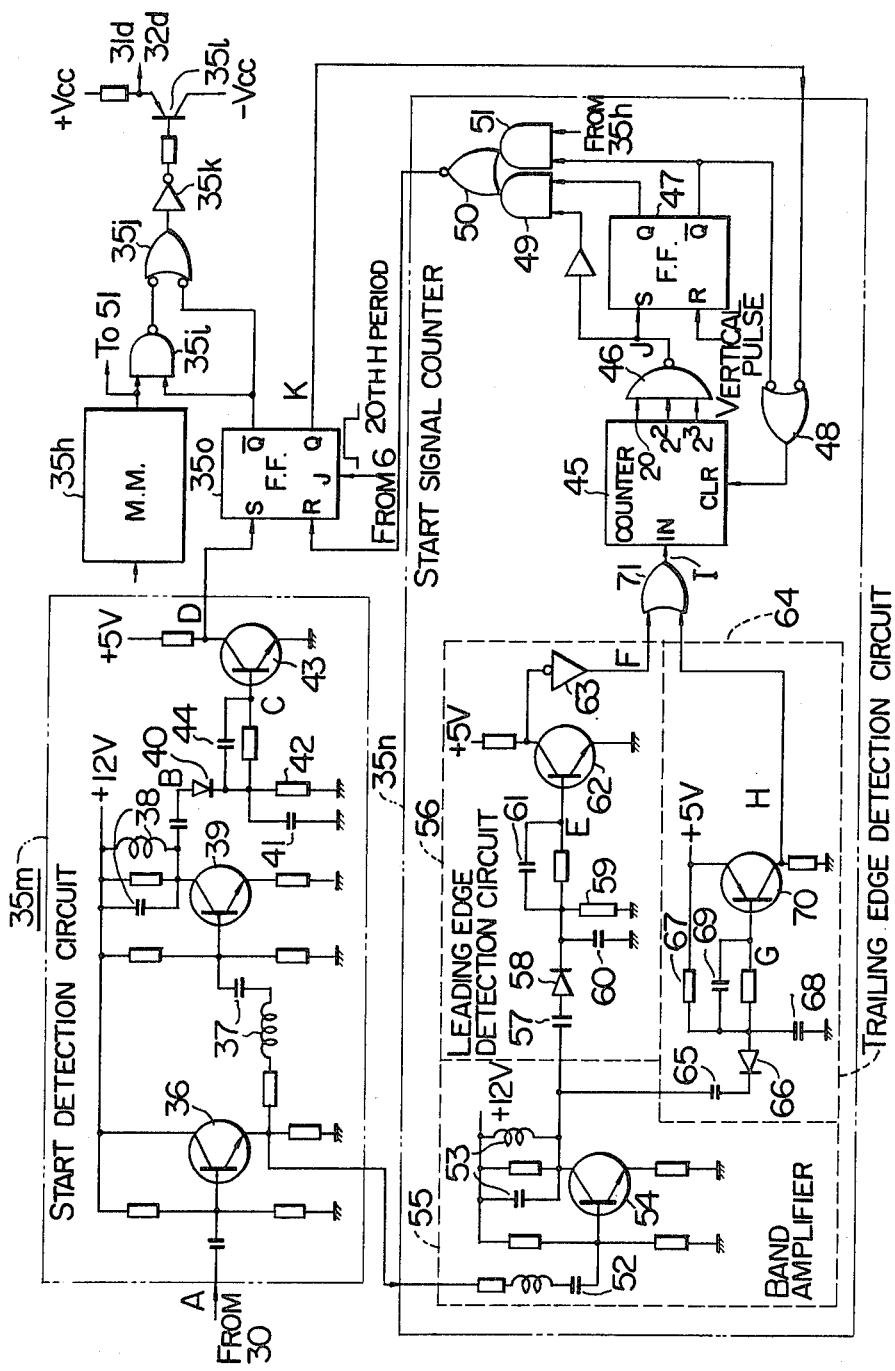
FIG. 13 shows another embodiment of a start signal counting circuit.
Figure 14:
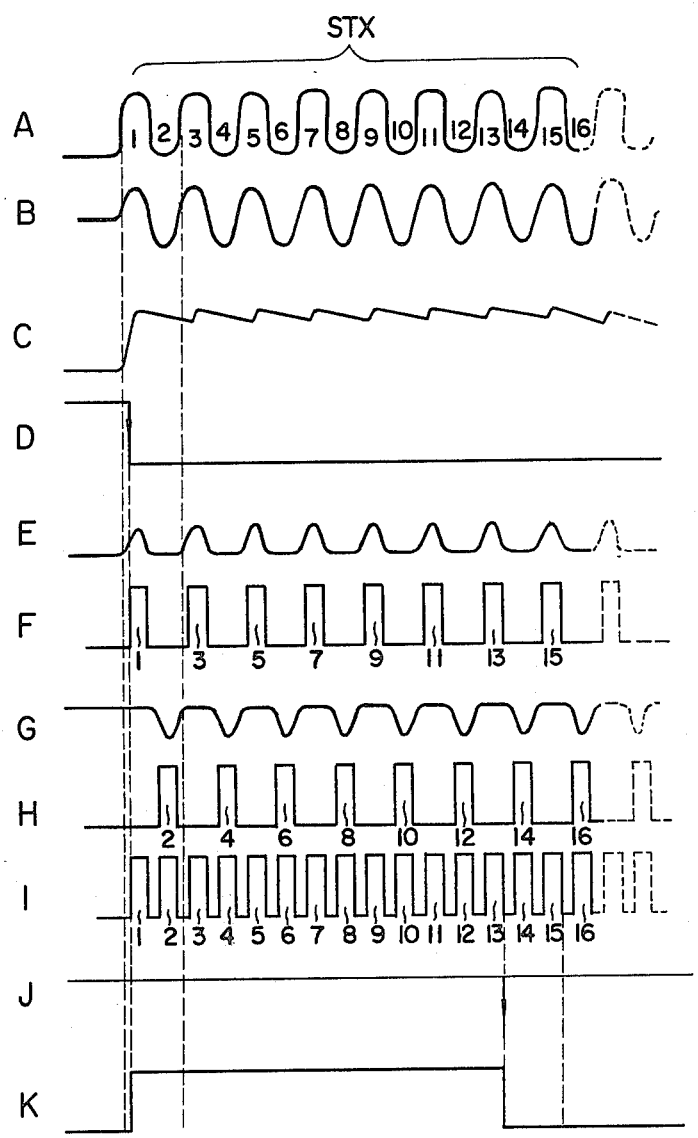
FIG. 14 shows waveforms at various points in the circuit of FIG. 13.

Referring to FIGS. 13 and 14, an embodiment in which both the leading edge and the trailing edge of the pulses of the start signal STX are counted is now explained. In the present embodiment, the start detection circuit 35m and the counter are identical to those shown in FIG. 10 and designated by the same reference numerals, and hence they are not explained here.

A reception signal, as shown in FIG. 14A, derived from the pedestal clamp circuit 30 is applied to transistors 36 and 39 to produce a fundamental frequency component of the start signal STX as shown in FIG. 14B. This signal is peak-detected by the diode 40, the capacitor 41 and the resistor 42 to produce a detection output as shown in FIG. 14C, which is used to switch the transistor 43 to produce the beginning detection output as shown in FIG. 14D. The flip-flop 35o is set thereby as shown in FIG. 14K.

The reception signal, as shown in FIG. 14A, derived from the emitter of the transistor 36 (or from the pedestal clamp circuit 30) is applied to a band amplifier circuit 55 which comprises a transistor 54 to which a series resonance circuit 52 and a parallel resonance circuit 53 tuned to the fundamental frequency of the start signal STX are connected, to extract the fundamental frequency component of the start signal STX in the form of a sine wave as shown in FIG. 14B. The extracted signal is then applied to a leading edge detection circuit 56 in which it is differentiated by a capacitor 57, a diode 58 and a resistor 59 to produce a differentiation output at a leading edge of each pulse of the start signal STX, as shown in FIG. 14E. Numeral 60 denotes a small capacitance, noise eliminating capacitor, and 61 denotes a speed-up capacitor. The differentiation output E is applied to a transistor 62 to switch it, and an output from the transistor 62 is inverted by an inverter 63 to produce a leading edge detection output as shown in FIG. 14F. The output of the band amplifier circuit 55 is also applied to a trailing edge detection circuit 64, in which it is differentiated by a capacitor 65, a diode 66 and a resistor 67 to produce a differentiation output at a leading edge of each pulse of the start signal STX as shown in FIG. 14G. Numeral 68 denotes a small capacitance, noise eliminating capacitor and 69 denotes a speed-up capacitor. The differentiation output G is then applied to a transistor 70 to switch it, which in turn produces a trailing edge detection output as shown in FIG. 14H.

The leading edge detection output F and the trailing edge detection output H are combined in an OR gate 71 to produce a leading/trailing edge detection output as shown in FIG. 14I, which is counted by the counter 45. In the present embodiment, a detection output as shown in FIG. 14J is produced when 13 pulses of the detection output I have been counted, and the flip-flop 35o is reset thereby. As a result, the flip-flop 35o produces the sampling pulse which exactly appears within the duration of the start pulse STX, as shown in FIG. 14K.

While the amplitude correction circuit 29 and the pedestal clamp circuit 30 are arranged in this order in the illustrated embodiment, they may be arranged in the opposite order.

Furthermore, although the illustrated embodiment controls the gain of the amplitude adjusting circuit 29 by the detection output of the upper level detecting circuit 31 and controls the clamp level of the pedestal clamp circuit 30 by the detection output of the lower level detecting circuit 32, the relation may be inverted, that is, the clamp level may be controlled by the detection output for the upper level and the amplitude may be controlled by the detection output for the lower level to control the upper and lower levels of the signal to the predetermined levels.

Furthermore, while the D.C. level and the amplitude of the information signal to be supplied to the slice circuit are maintained constant, in the embodiment described above, to control the slice level for the still image video signal to the constant level, another approach may be used, in which, contrarily to control the D.C. level and the amplitude of the signal, the received information is applied to the slice circuit as it is and the slice level of the slice circuit is controlled by the detection outputs for the upper level and the lower level of the information signal to maintain a relative positional relationship between the information signal and the slice level constant. In this case, the upper and lower levels may be detected by the upper and lower level detecting circuits which are of similar circuit configuration to those shown in the illustrated embodiments and the detection outputs may be combined by a resistor matrix circuit to produce a slice level at the midpoint of both levels, and the still image video signal may be sliced by the midpoint slice level.

Since the number of pulses of the start signals is counted to produce the sampling pulse to assure that the sampling pulse for sampling the levels of the start signal terminates within the duration of the start signal, in the upper and lower level detecting circuits, the levels of the start signal can be exactly detected and the slice level can be very exactly controlled.

The present invention can be widely applied to various systems for transmitting bi-level information signals other than the still image transmission system described above.

What is claimed is:

1. A multiplexed information signal receiving system comprising:

a receiving circuit for receiving a television signal on which a bi-level information signal is superimposed in a vertical retrace period;

a slice circuit for slicing the received information signal to reshape it into a bi-level signal;

an upper level detecting circuit for detecting an upper level of a start signal indicative of a reference phase and a reference amplitude inserted at a leading portion of said information signal;

a lower level detecting circuit for detecting a lower level of said start signal; and control means responsive to detection outputs from said upper level detecting circuit and said lower level detecting circuit for automatically adjusting a slice level of said slice circuit to a predetermined level.

2. A multiplexed information signal receiving system according to claim 1 wherein said detection outputs from said upper level detecting circuit and said lower level detecting circuit are fed back to an amplifier/processing circuit for the information signal to control a D.C. level of the information signal applied to said slice circuit whereby the D.C. level of the information signal is automatically adjusted to the predetermined level relative to a reference level of said slice circuit.

3. A multiplexed information signal receiving system according to claim 1 or 2 further comprising an amplitude correction circuit responsive to one of the detection outputs from said upper level detecting circuit and said lower level detecting circuit for automatically adjusting the amplitude of the information signal to a predetermined amplitude and a pedestal clamp circuit responsive to the other detection output for automatically adjusting the pedestal level for the information signal to a predetermined level, said amplitude correction circuit and said pedestal clamp circuit being inserted in a preceding stage to said slice circuit, whereby the amplitude and the pedestal level of the information signal are automatically adjusted to the predetermined levels to adjust the slice level to the predetermined level.

4. A multiplexed information signal receiving system according to claim 1 or 2 wherein said upper level detecting circuit includes a peak detection circuit for peak-detecting a start signal portion of said information signal and a sample-and-hold circuit for sampling and holding a peak detection output from said peak detection circuit during the duration of said start signal, and said lower level detecting circuit includes a peak detection circuit for peak-detecting a start signal portion of an information signal which is a polarity-inverted version of said information signal and a sample-and-hold circuit for sampling and holding a peak detection output from said peak detection circuit during the duration of said start signal.

5. A multiplexed information signal receiving system according to claim 1 or 2 further comprising a sampling pulse generating circuit for counting the number of pulses of said start signal and responsive to a count output to define a trailing edge of a sampling pulse within the duration of said start signal, said sampling pulse being applied to said upper level detecting circuit and said lower level detecting circuit as a level detecting sampling pulse.

6. A multiplexed information signal receiving system according to claim 5 wherein said start signal is extracted by a band amplifier circuit resonating to a fundamental frequency of said start signal, and a leading edge of said sampling pulse is defined by a detection output derived by detecting the extracted start signal.

7. A multiplexed information signal receiving system according to claim 6 wherein a leading edge or a trailing edge of each pulse of said start signal is counted to produce said count output.

8. A multiplexed information signal receiving system according to claim 6 wherein both a leading edge and a trailing edge of each pulse of said start signal are counted to produce said count output.

9. A multiplexed information signal receiving systm according to claim 5 wherein a leading edge or a trailing edge of each pulse of said start signal is counted to produce said count output.

10. A multiplexed information signal receiving system according to claim 5 wherein both a leading edge and a trailing edge of each pulse of said start signal are counted to produce said count output.

* * * * *